(No Model.) 2 Sheets—Sheet 1.

A. C. ROGERS.
CAR BRAKE.

No. 379,983. Patented Mar. 27, 1888.

Witnesses

Inventor,
Albert C. Rogers.
By his Attorneys (No Model.) 2 Sheets—Sheet 2.
A. C. ROGERS.
CAR BRAKE.
No. 379,983. Patented Mar. 27, 1888.
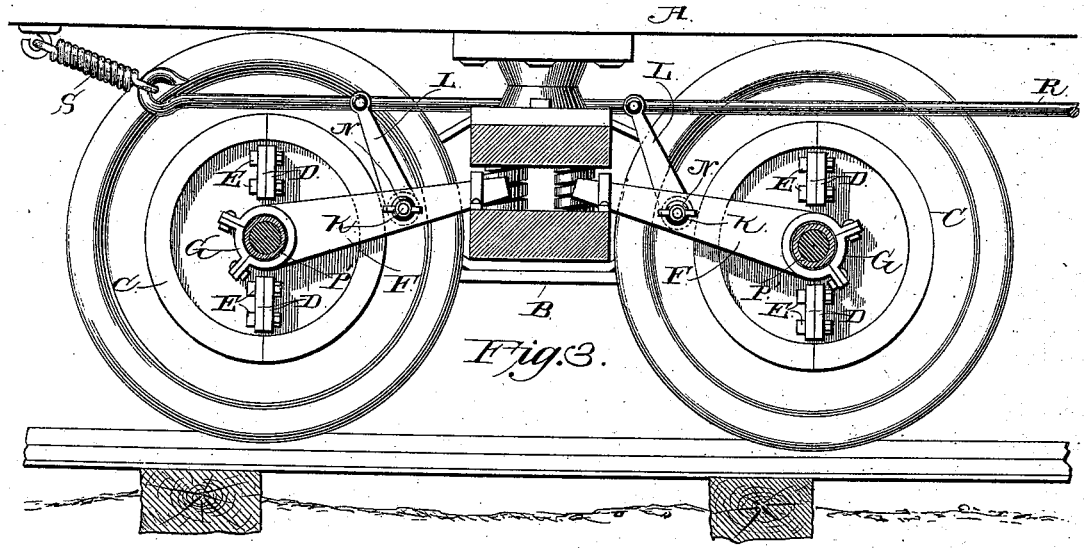
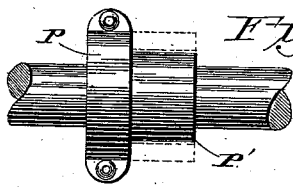
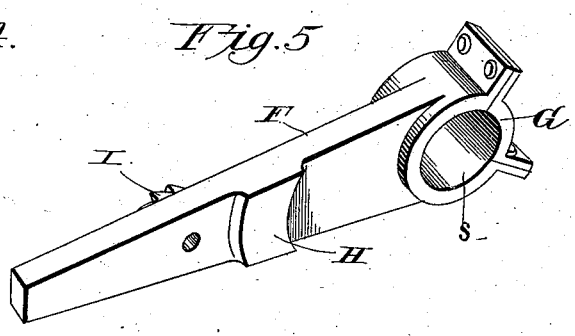
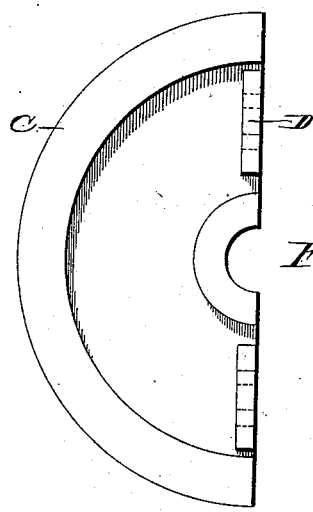
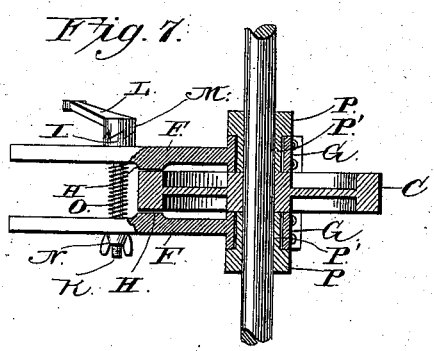
Witnesses
Inventor,
Albert C. Rogers.
By his Attorneys

UNITED STATES PATENT OFFICE.

ALBERT C. ROGERS, OF ALFRED, NEW YORK.

CAR-BRAKE.

SPECIFICATION forming part of Letters Patent No. 379,983, dated March 27, 1888.

Application filed January 7, 1888. Serial No. 260,068. (No model.)

*To all whom it may concern:*

Be it known that I, ALBERT C. ROGERS, a citizen of the United States, residing at Alfred, in the county of Allegany and State of New York, have invented a new and useful Improvement in Car-Brakes, of which the following is a specification.

My invention relates to an improvement in car-brakes; and it consists in the peculiar construction and combination of devices, that will be more fully set forth hereinafter, and particularly pointed out in the claims.

Figure 1:
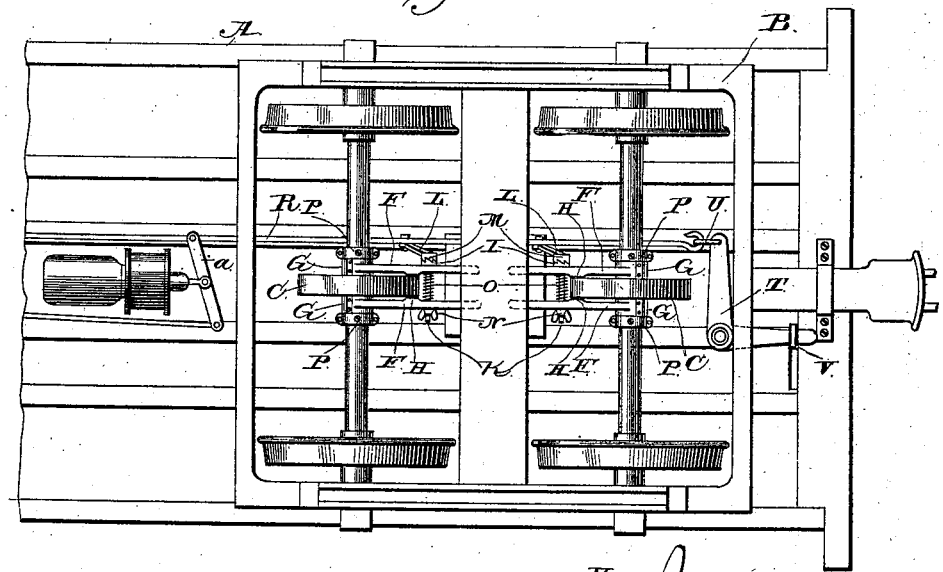
Figure 2:
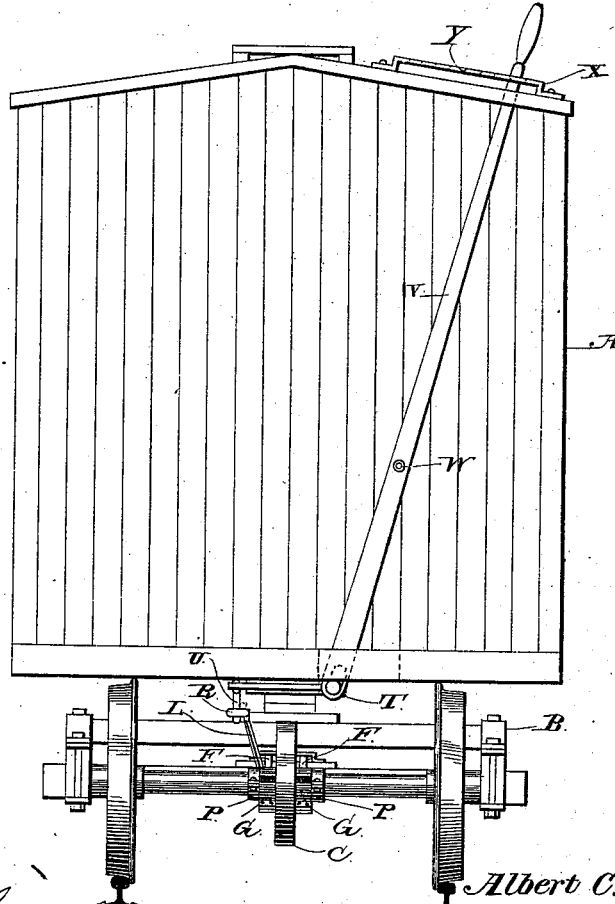

In the accompanying drawings, Figure 1 is an inverted plan view of a portion of a railroad-car provided with a brake embodying my improvements. Fig. 2 is an end elevation of the same. Fig. 3 is a vertical longitudinal sectional view. Figs. 4, 5, 6, and 7 are enlarged detail views.

A represents the body of the car, and B represents one of the trucks arranged under the same, the said truck being of the usual construction.

C represents a friction brake-wheel, which is made in two semicircular sections, having laterally-projecting flanges D on their plane inner edges and bolts E extending through said flanges and bolting the sections of the wheel together on the central portion of the axle of the truck. One of these friction-wheels is attached to each axle of the truck, and the said wheels are secured to the said axles by means of keys or in any other suitable manner, so that the axles cannot rotate independently of the friction-wheels.

Secured to each axle on opposite sides of the friction-wheel is a pair of friction plates or shoes, F, which shoes or plates have removable blocks G in their outer ends bolted in position and openings formed in their ends and in the said blocks for the reception of the axles. These blocks are bolted to the plates or shoes, and are removable therefrom to permit the latter to be removed from or attached to the axles, as will be readily understood. The axles are journaled in the said openings, so that the axles may rotate therein. On the opposing sides of the plates or shoes F are offsets or shoulders H, which are adapted to impinge against opposite sides of the rims of the friction-wheels, and on the outer side of one of the plates or shoes F of each pair is formed a cam, I.

K represents a bolt which extends transversely through and connects each pair of plates or shoes. To one end of the said bolt is pivoted the inner end of a lever, L, having a cam, M, which bears against the cam I, and to the opposite end of the bolt is screwed a nut, N, which limits the lateral motion of the free portions of the plates or shoes. A coiled extensile spring, O, is placed on the bolt, and the ends thereof bear against the opposing sides of the friction plates or shoes, the function of the said spring being to normally move the friction plates or shoes apart, so as to prevent them from impinging against the friction-wheel. The inner ends of the plates or shoes are secured to the central beam of the truck by means of U-shaped bolts, as shown, or in any other suitable manner, so that the said plates or shoes cannot turn with the axles, but are free to move laterally from and toward each other. Collars P, made of semicircular sections, are bolted together on the axles on opposite sides of the outer ends of the friction plates or shoes to prevent the latter from moving laterally on the axle. Said collars have sleeves P', on which the friction-plates are mounted, and thereby the latter are prevented from wearing the axle.

R represents an operating-rod, which is connected to the upper ends of the levers L by means of pivotal bolts and arranged longitudinally under the end of the car. Connected to the inner end of the said rod and to the bottom of the car is a coiled retractile spring, S, which normally moves the rod rearward, so as to turn the levers and cause the cams thereof, in connection with the cams I of the friction plates or shoes, to release the latter from the friction-wheels C. Under the bottom of the car, near the end thereof, is fulcrumed a bell-crank lever, T, which has its laterally-extending arm connected to the front end of the rod R by means of a link, U.

V represents a brake-lever, which is arranged on the front of the car, is fulcrumed thereto by a bolt, W, and has an opening or slot in its lower end, through which the forward-extending arms of the bell-crank lever project. The upper end of the brake-lever projects above the top of the car, and is guided in a traveler, X, which is provided on its inner side with a series of ratchet-teeth, Y, adapted to engage the brake-lever and hold the same in any desired position.

The operation of my invention is as follows: In order to apply the brakes the upper end of the lever V is moved inward toward the center of the car, so as to turn the bell-crank lever T and cause the latter to move the rod R forward against the tension of the spring S. The said rod causes the levers L to turn, and the cams M and I force the friction plates or shoes toward each other against the tension of the spring O and cause the shoulders or offsets H to impinge so tightly against opposite sides of the rims of the brake or friction wheel C as to retard or entirely prevent the rotation of the axles, and thereby check the speed of the car.

In Fig. 1 I illustrate the cylinder of an ordinary atmospheric-brake apparatus, and show a lever, $a$, connecting the piston-rod of the same with the operating-rod R. From this it will appear that my improved brake is adapted to be operated by hand or by atmospheric pressure, or both.

Having thus described my invention, I claim—

1. In a car-brake apparatus, the combination of the friction-wheels C, secured to the car-axles, the shoes or plates F, journaled loosely on the axles and adapted to impinge against opposite sides of the friction-wheels, the levers L, adapted to operate the said shoes or plates, and the rod R, connected to the said levers, and the spring S, connected to said rod, for the purpose set forth, substantially as described.

2. The combination, in a car-brake apparatus, of the friction-wheels C, attached to the axle, the lateral movable plates or shoes F, adapted to engage the friction-wheels, the bolts connecting the said plates or shoes in pairs, the springs to normally force the said plates apart, and the levers L, pivoted on the said bolts and having cams to close the plates or shoes against the friction-wheels, substantially as described.

3. The combination, in a car-brake apparatus, of the friction-wheels C, made in sections, bolted together and secured rigidly to the car-axles, the friction shoes or plates F, loosely journaled on the axles on opposite sides of the friction-wheels and having the removable blocks G, said plates being secured to the truck and prevented from rotating with the axles, the springs normally forcing the shoes or plates from the friction-wheels, the levers adapted to apply the shoes or plates to the friction-wheels, the rod R, connected to the said levers, and means, substantially as set forth, to operate the said rods, substantially as described.

4. The combination, in a car-brake, of the friction-wheels C, secured to the axles, the friction-plates F, loosely journaled on the axles on opposite sides of wheels C, one of each pair of said plates having cam I, the bolts K, extending transversely through the friction-plates, and the levers L, pivoted on said bolts and having cams M, engaging cams I, substantially as described.

5. The combination, in a car-brake, of the friction-wheel C, secured to the car-axle, the friction-plates loosely journaled on the car-axle on opposite sides of the wheel C, one of said plates having cams I, the bolt K, connecting said plates, the spring O on said bolts to force the plates apart, the adjusting-nut N on said bolt, and the lever to press the plates against the wheel C against the tension of spring O, substantially as described.

6. In a car-brake, the combination of the friction-wheel C, secured to the car-axles, and the shoes or plates F, journaled loosely on the axle and adapted to impinge against the sides of the friction-wheel, and springs to keep the shoes off the wheels, said shoes being arranged on opposite sides of the said wheels.

7. In a car-brake, the combination of the friction-wheels C, secured to the car-axles, the friction shoes or plates F, mounted loosely on the axles at one end and secured to the truck at the other end, so as to be prevented from rotating with the axles, the spring for holding the shoes or plates off the wheels, said shoes or plates being arranged on opposite sides of said wheels, the lever L, connecting with the shoes or plates, and connections for operating the lever L, as set forth.

In testimony that I claim the foregoing as my own I have hereto affixed my signature in presence of two witnesses.

ALBERT C. ROGERS.

Witnesses:
GEO. W. TRUMAN,
M. W. GREEN.